United States Patent [19]

Yamamoto

[11] Patent Number: 4,507,772
[45] Date of Patent: Mar. 26, 1985

[54] PLAYBACK OPTICAL SYSTEM FOR VIDEO DISCS

[75] Inventor: Kimiaki Yamamoto, Hachiouji, Japan

[73] Assignee: Olympus Optical Co., Ltd., Tokyo, Japan

[21] Appl. No.: 489,397

[22] Filed: May 4, 1983

Related U.S. Application Data

[63] Continuation of Ser. No. 235,988, Feb. 19, 1981, abandoned.

[30] Foreign Application Priority Data

Feb. 20, 1980 [JP] Japan ................................. 55-19237

[51] Int. Cl.³ .............................................. G11B 7/12
[52] U.S. Cl. ....................................... 369/109; 369/118
[58] Field of Search .................... 369/109, 111, 118; 358/342; 350/162.11, 448; 356/237, 345, 342

[56] References Cited

U.S. PATENT DOCUMENTS

| 3,497,704 | 2/1970 | Holmes | 350/162 SF |
| 3,809,478 | 5/1974 | Talbot | 350/162 SF |
| 3,891,968 | 6/1975 | McMahon | 350/162 SF |
| 3,956,582 | 5/1976 | Bouwhuis | 369/109 |
| 3,969,575 | 7/1976 | Gerritsen | 369/45 |
| 4,037,965 | 7/1977 | Weiss | 350/162 SF |
| 4,062,623 | 12/1977 | Suzuki | 350/162 SF |
| 4,160,269 | 7/1979 | Kramer | 369/118 |

OTHER PUBLICATIONS

"Simple Optical Experiments in which Spoiled Filtering Removes the Noise from Pictures" by Jearl Walker, Scientific American, Nov., 1982, pp. 194-206.

Primary Examiner—Alan Faber
Attorney, Agent, or Firm—Cushman, Darby & Cushman

[57] ABSTRACT

A playback optical system for video discs comprising a light shield plate arranged in the vicinity of the pupil of the read-out lens, said optical system facilitating design of said read-out lens and permitting adjustment of focal length.

3 Claims, 7 Drawing Figures

PLAYBACK OPTICAL SYSTEM FOR VIDEO DISCS

This is a continuation of application Ser. No. 235,988, filed Feb. 19, 1981, abandoned.

BACKGROUND OF THE INVENTION (a) Field of the invention:

The present invention relates to a playback optical system for video discs.

(b) Description of the prior art:

Since a video disc optical system is a diffraction-limited optical system, aberrations in a read-out lens for video discs to be used for reading information must be corrected as favorably as those in an objective lens system for microscopes. In addition, light weight is another requirement for a read-out lens for video discs and, therefore, it must consist of lens components in a number as small as possible. Accordingly, it is very hard to design a favorable read-out lens for video discs.

On video discs, information is recorded in rows of phase grooves called pits. In order to increase information density, it is necessary to minimize intervals of the pits and tracks (distance between neighboring rows of pits). The pit width is narrower than diameter of the beam spot used for reading information from the discs, and lower limits (minimum values) of the pit interval and tracks interval are determined by diameter of the spot. In order to increase information density, it is therefore necessary to minimize diameter of the beam spot to be used for reading out information. In order to minimize diameter of the beam spot, it is generally practiced to use a lens system having a large numerical aperture (N.A.) as the read-out lens for video discs. When a large N. A. is selected for an objective lens, working distance is shortened and it becomes rather hard to correct aberrations favorably. If it is attempted to solve these problems by increasing number of lens element composing the read-out lens, it will increase weight of the lens and result in other disadvantages for a playback lens system for video discs.

Moreover, pit width must be within a definite range in order to read information with the ordinary type of the conventional read-out lens. For this reason, a writing lens used for recording information must also have a large N. A. and favorably corrected aberrations.

SUMMARY OF THE INVENTION

A general object of the present invention is to provide a playback optical system for video discs having a light shield plate which is to be used for shielding the center thereof and arranged in the vicinity of the pupil of the lens system used for playback.

DETAILED DESCRIPTION OF THE PRESENT EMBODIMENT

Figure 1:
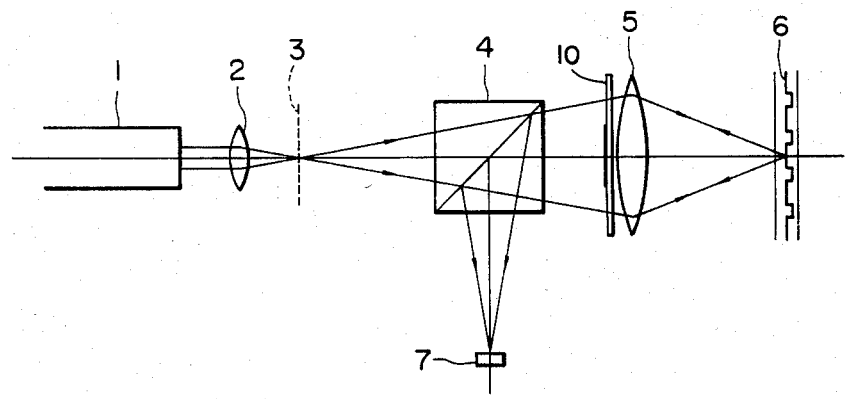
FIG. 1 shows a sectional diagram illustrating the composition of the playback optical system for video discs.

The playback optical system for video discs is schematically shown in FIG. 1, wherein the reference numeral 1 represents a laser light source, the reference numeral 2 designates a lens, the reference numeral 3 denotes surface of an object, the reference numeral 4 represents a half mirror, the reference numeral 5 designates a read-out lens, the reference numeral 6 denotes an image plane (surface of disc) and the reference numeral 7 represents a detector. In this optical system, the light beam emitted from the laser light source is condensed by the read-out lens onto the disc surface 6, where the light beam is reflected and diffracted, and then is condensed again by the read-out lens 5 onto the detector 7 for detection. In this optical system, read-out of information is performed as described below. When the light beam falls on the area other than the pit on the disc surface, almost all the light is reflected and detected, and the maximum light quantity is detected with the detector. When the light beam is focused onto the pit, in contrast, almost all the return light is diffracted outside the read-out lens and scarcely detected with the detector. It is possible to read out information by utilizing the fact described above.

Figure 2:
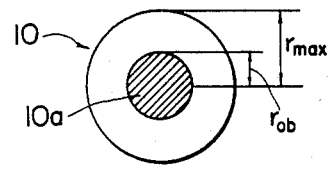
FIG. 2 shows a plan view of the light shield plate used in the playback optical system according to the present invention.

The playback optical system according to the present invention comrises a light shield plate 10 having a central light shield part 10a as shown in FIG. 2 arranged on the optical axis of the read-out lens 5 and at or in the vicinity of the pupil of the lens 5 between the light source 1 and disc surface 6, or uses a lens system which may be called a lens system having a light shield at its center. In Fig. 2, the reference symbol rmax denotes semi-diameter of the light shield plate 10, that is, an exit pupil of the lens 5, and the reference symbol rob denotes semi-diameter of the central light shield part 10a of the plate 10.

Now let us consider a case in which the above-mentioned lens having a light shield is used as the read-out lens in the optical system shown in FIG. 1.

When coordinates of the object plane are represented by (u, v), coordinates of the image plane are designated by (u′, v′) and coordinates of the pupil of the read-out lens are denoted by (x, y) on an assumption that (u, v) and (u′, v′) are dimensionless coordinates represented in the diffraction unit, (x, y) are dimensionless coordinates normalized taking radius of the pupil as 1, p(x, y) is the pupil function of the lens and g(u, v) is sensitivity distribution of the detector, it is possible to calculate detection electric signal i(t) by the following equation:

$$i(t) = \int\int g(u,v) | \int\int a(x,y;t)p(x,y)e^{2\pi i(ux+vy)}dxdy|^{hu\ 2}dudv \quad (1)$$

wherein, $$a(x,y;t) = \int\int A(u',v')R(u'-st,v')e^{-2\pi i(u'x+v'y)}du'dv' \quad (2)$$

$$A(u',v') = \int\int f(x,y)p(x,y)e^{2\pi i(xu'+yv')}dxdy \quad (3)$$

Further, $R(u',v')$ represents reflectance on the image plane at time $t=0$, s designates circumferential speed of the disc on the track irradiated with the light beam and $f(x, y)$ denotes amplitude distribution (usually Gauss distribution) of the incident laser beam on the lens pupil.

When it is possible to assume $g(u, v) = 1$ at a constant detector sensitivity, Parseval's theorem permits transforming the equation (1) as follows:

$$i(t) = \int\int |a(x,y;t)p(x,y)|^2 dxdy \quad (1)$$

Figure 5:
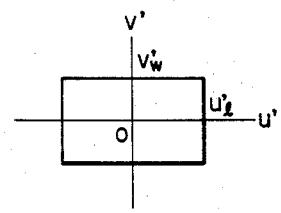
FIG. 5 shows a diagram illustrating shape of a pit.
Figure 3:
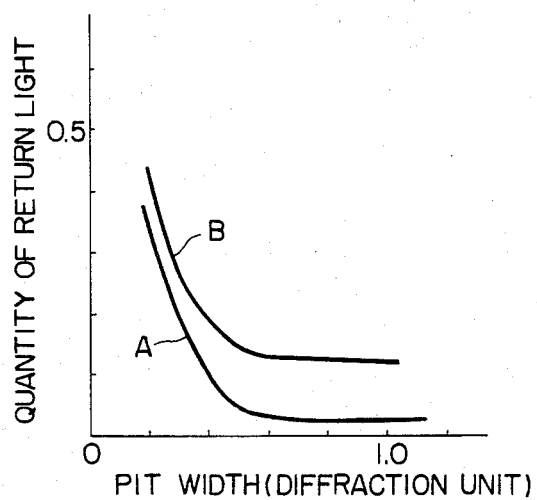
FIG. 3 shows graphs illustrating interrelation between pit width and quantity of return light obtainable with the optical system according to the present invention.

Since detector sensitivity can usually be regarded as constant, detector signal can be calculated by the equation (4) in most cases. FIG. 3 shows results obtained by calculating detector signals i(o) by the equation (4) when the above-mentioned lens having a light shield is used as the read-out lens assuming that the pit has such a rectangular shape as shown in FIG. 5.

For this calculation, reflectance was set at $R(u',v') = 1$ outside the pit and $R(u', v') = e^{i\pi} = -1$ that inside the pit, amplitude distribution of the incident light beam was considered as a constant at $f(x, y) = 1$ on the lens pupil, and shielding ratio of the pupil rob/max was set at 0.5. Further, pit length ($=2u'l$) was set at twice the beam spot size (radius setting intensity at $1/e^2$) and calculated as a function of the pit width ($=2u'w$). Furthermore, normalization was made so as to set i(o) at 1 in a condition completely free from pit. In FIG. 3, curve A represents calculation values obtained when the optical system is in focus, whereas curve B corresponds to calculation values at defocused position by $\lambda/4$ in wave plane aberration of the read-out lens.

Judging from FIG. 3, it is confirmed that the light is scarcely returned and the lens system can function sufficiently as a playback optical system for video discs at a pit width of approximately 0.4 or wider even by using the lens having light shield at its center.

Figure 4:
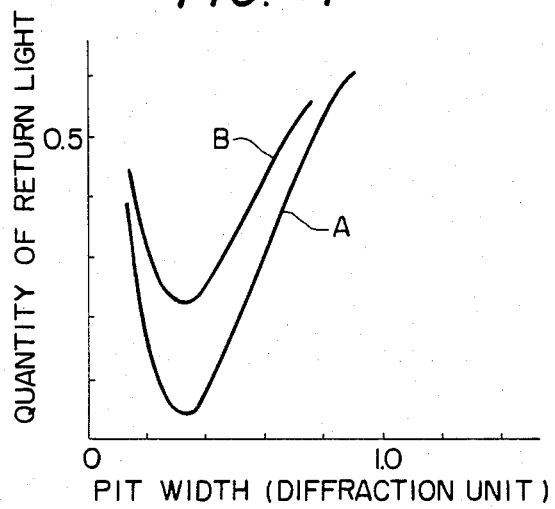
FIG. 4 shows graphs illustrating interrelation between pit width and quantity of return light obtainable with the conventional playback optical system for video discs.

FIG. 4 shows the same characteristic of an ordinary lens as that shown in FIG. 3. Comparison between FIG. 3 and FIG. 4 will clarify the fact that pit width assuring minimum return light quantity is limited within a very narrow range in case of an ordinary lens, but very wide in case of lens having a light shield at its center. Further, it will be understood that the lens having a light shield at its center assured less increase of return light at the position of $\lambda/4$ out-of-focus. That is to say, it will be understood that the lens having a light shield at its center is more excellent for operating video systems more stably. Furthermore, the lens having a light shield at its center is compatible with wider pit width corresponding to the minimum return light quantity. This suggests a possibility to minimize numerical aperture of the lens for writing information and therefore facilitate designing of lens to be used for writing. Speaking more concretely, when an ordinary lens such as the conventional one is used for playback, it is necessary to maintain pit width at a certain constant value (width to assure a minimum return light quantity) for recording information on dics. For this reason, the writing lens must have the largest N. A. in addition to favorably corrected aberrations, and must be precisely focused in writing information (defocusing will increase pit width and is undesirable). In case of the lens having a light shield at its center, however, return light quantity is scarcely increased even if pit width is larger than a certain definite value (corresponding to the minimum return light quantity) in writing. Since the lens having a light shield at its center assures the minimum return light quantity at wider pit width than for ordinary lens used for reading, the lens having a light shield at its center can have smaller N. A. and facilitate correction of aberrations. In other words, the lens having a light shield at its center to be used for playback (reading information) facilitates to design a lens for writing as compared with the ordinary lens for reading. Further, the lens having a light shield at its center permits simplifying, writing operations since it can prevent influence due to defocusing which blurs image and widens width of pits recorded. Furthermore, as is clear from FIG. 3 and FIG. 4, if defocusing is caused at playback, the lens having a light shield at its center can assure smaller return light quantity and less variation of return light quantity due to variation of pit width than the ordinary lens. The lens having a light shield at its center eliminates the fear of erroneous read-out regardless of slight defocusing and permits reproducing recorded information with higher fidelity.

Figure 6:
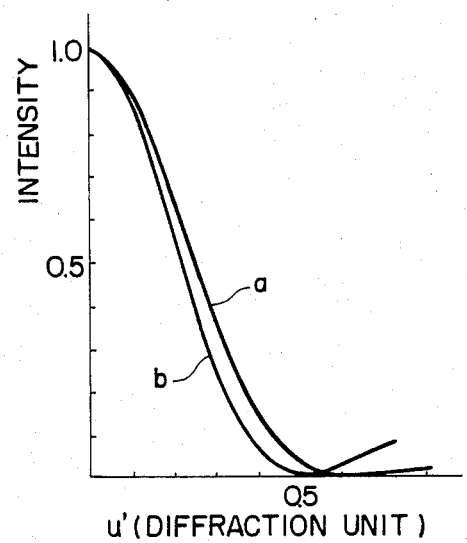
FIG. 6 shows graphs illustrating intensity distribution on the beam spot available with the conventional optical system and that obtainable with the optical system according to the present invention.

In the next place, FIG. 6 shows intensity distribution on beam spot formed on a disc when a light beam having uniform intensity distribution is incident on the read-out lens, curve a corresponding to intensity distribution obtainable with the ordinary lens and curve b corresponding to that available with the lens having a light shield at its center. As in understood from FIG. 6, the lens equipped at its center with a light shield has a central light patch narrower than that of the ordinary lens. Therefore, the lens having a light shield at its center provides a smaller beam spot and makes it possible to read out information recorded at higher density. The lens having a light shield at its center allows to record information at higher density. Moreover, the lens having a light shield at its center has narrower area allowing light to pass therethrough, thereby making it easier to design the lens system which consists of a smaller number of lens components and is therefore lighter in its weight.

Figure 7:
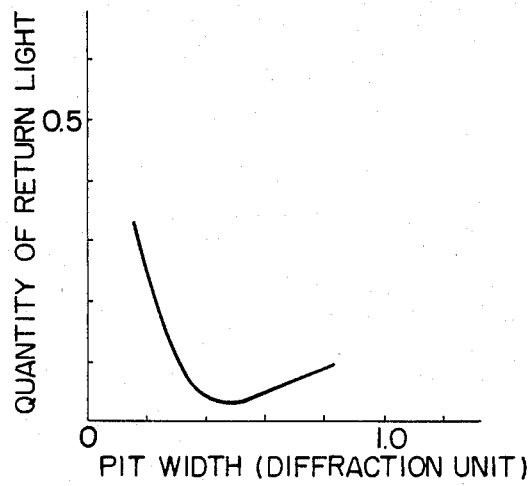
FIG. 7 shows a graph illustrating interrelation between pit width and quantity of return light when the light shield plate has a shielding ratio of 0.3 in the optical system according to the present invention.

Though the embodiment of the present invention has been described above taking a lens having a light shield designed for a shielding ratio of 0.5 as an example, a lens having a light shield designed for different shielding ratio will be effective sufficiently. FIG. 7 shows detector signal characteristic of a lens having light shield designed for shielding ratio of 0.3 as an example. The return light quantity shown in FIG. 7 is larger than that on the curve A in FIG. 3 at wider pit widths but is still smaller than that shown in FIG. 4 illustrating the characteristic of the conventional lens. Therefore, the lens having a light shield designed for shielding ratio of 0.3 can sufficiently provide the effect of the lens according to the present invention.

Though the above descriptions have been made on a lens having a light shield at its center, the principle of the present invention is applicable also to reflection objectives. It is therefore possible to compose an optical system equipped with a reflection objective for video discs by aplying the principle of the present invention while making designing contrivance.

The playback optical system according to the present invention described above makes it possible to easily design a lightweight read-out lens to be used therein. Further, it minimizes light convergence due to diffraction in condensing light, thereby making it possible to record information at higher density. Furthermore, it increases depth of focus, thereby providing effects to facilitate adjustment of focal point of video disc systems, etc. Moreover, it is free from influence due to slight defocusing in recording stage and is therefore compatible with writing lenses having small N. A., therey facilitating designing of writing lenses.

I claim:

1. A playback optical system for video discs comprising a light source, a lens system for condensing a light beam emitted from said light source on the disc surface, a light shield member arranged on the optical axis of said lens system in the vicinity of the pupil of said lens system between said light source and disc surface and having a light shield part at the center thereof to shield the center part of the light beam to advance from said light source to said disc surface through said lens system and a detector for receiving the light reflected on said disc surface through said lens system.

2. A playback optical system for video discs according to claim 1 wherein the ratio of semi-diameter of said light shield part to semi-diameter of said light shield plate is at least 0.3.

3. A playback optical system for video discs according to claim 1 wherein the ratio of semi-diameter of said light shield part to semi-diameter of said light shield plate is 0.5.

* * * * *